Figures 1, 2:
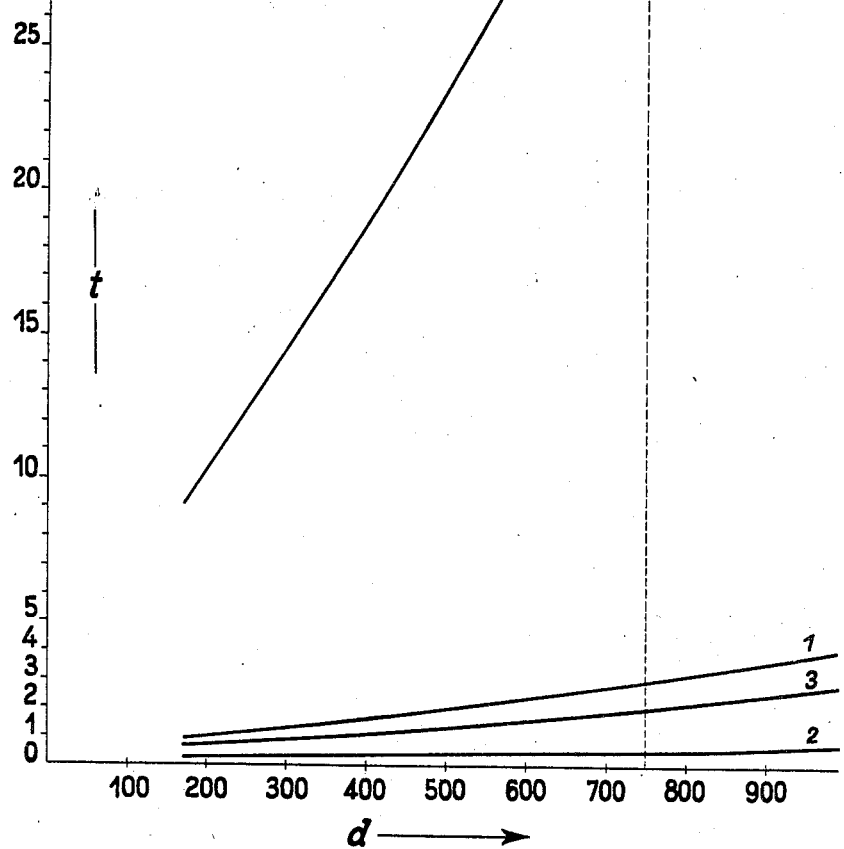

Jan. 9, 1934.     E. BERGER     1,943,051

OPTICAL GLASS

Filed July 27, 1932

Inventor:
Edwin Berger

Patented Jan. 9, 1934

1,943,051

UNITED STATES PATENT OFFICE 1,943,051

OPTICAL GLASS

Edwin Berger, Jena, Germany, assignor to firm Jenaer Glaswerk Schott & Gen., Jena, Germany Application July 27, 1932, Serial No. 625,109, and in Germany July 29, 1931

5 Claims. (Cl. 106—36.1)

It is well known that optical glasses of high refractive indices are more or less liable to become stained by humidity, especially by the influence of weak acids, for instance perspiration, these stains being iridescent and metallically shining spots on the surface. Indicating on the coordinate axes of a diagram the refraction ($n_d$) and the relative dispersion ($\gamma$) of the glasses, respectively, it will be found that the said liability to become stained, or stain sensitiveness, is to be feared more or less on that side of a straight line passing through the points $n_d=1.54$, $\gamma=62$ and $n_d=1.64$, $\gamma=35$ which is coordinated to the higher values of $n_d$. The fact that the glasses in question are above the said line is shown by the following relation of $n_d$ and $\gamma$ $$n_d > 1.77 - 0.0037\gamma.$$

Such glasses are used for many optical instruments, for instance telescopes, as well as for photographic objectives and melted bifocal spectacle lenses &c., and their stain sensitiveness therefore represents a serious disadvantage in instruments and lenses of the said kind.

The present invention aims at manufacturing glasses of the above-mentioned optical position, in which the stain sensitiveness is reduced even to imperceptibility. It has proved that adding titanium oxide ($TiO_2$) even in small quantities (0.5 to 5%), considerably reduces the stain sensitiveness. To attain this advantage it has been suggested to add to the glass circonium oxide ($ZrO_2$). However the effect of titanium oxide is disproportionately stronger, as is explained in the following examples.

In the accompanying drawing, Figure 1 is a diagram showing the area of the glasses concerned in the present invention, and Figure 2 a diagram illustrating the effect attained by the invention.

Figure 1 represents a system of coordinates in which the $\gamma$ and $n_d$ values are abscissas and ordinates, respectively. The area of the glasses to which the invention refers is above a straight dotted line passing through the points $n_d=1.54$, $\gamma=62$, and $n_d=1.64$, $\gamma=35$.

For numerically determining the stain sensitiveness, a short open glass cylinder with polished end surface was pressed on the polished surface of the glass to be examined, and this in such a manner that the cylinder adhered tightly enough to receive diluted nitric acid (approximately 1 normal). The whole was exposed to 100 centigrades. Owing to the effect of the acid, a layer of decomposed glass formed on the surface of the glass under examination. This layer, which gradually became thicker and thicker, presumably consisted of jelly of silicic acid. Owing to lower refraction, the said layer caused the colours of thin plates, that is to say the stains. Characterizing these colours by the thickness of a plano-parallel layer of air producing the same interference colour (compare for instance Geiger and Scheel, Handbuch der Physik, vol. 19, 1928, page 930), the result of the experiment may be represented by a diagram on the two axes of which are indicated the duration of the experiment and the colours in air thicknesses in $m\mu$, respectively. In this manner are obtained the lines 1 to 4 represented in Figure 2 of the drawing. In this Figure 2, the abscissas $d$ represent in $m\mu$ the thicknesses of air, and the ordinates $t$ in minutes the times required for the experiments. Each of the glasses represented in this drawing contains 96% of the following substances:

| | |
|---|---:|
| $B_2O_3$ | 5.0 |
| $Al_2O_3$ | 1.5 |
| $Na_2O$ | 2.8 |
| $CaO$ | 6.3 |
| $ZnO$ | 1.0 |
| $BaO$ | 35.8 |
| $Sb_2O_3$ | 0.5 |
| $As_2O_3$ | 0.3 |
| $SiO_2$ | 42.8 |
| | 96.0% |

The remaining 4% are $SiO_2$, $ZrO_2$, $ThO_2$ and $TiO_2$, respectively, the glasses therefore having the following properties:

| Glass | 1 | 2 | 3 | 4 |
|---|---|---|---|---|
| 96%+ | 4 $SiO_2$ | 4 $ThO_2$ | 4 $ZrO_2$ | 4 $TiO_2$ |
| $n_d$ | 1.599 | 1.613 | 1.619 | 1.628 |
| $\gamma$ | 57.6 | 56.3 | 54.8 | 50.7 |
| Time in minutes for 750 $m\mu$ | 2.8 | 0.6 | 2.0 | 36.0 |

The glass 4 is indicated in Figure 1. A frequently used baryta crown glass the stain sensitiveness of which has proved to be just disturbing in practice, had an optical position $n_d=1.569$, $\gamma=56.0$ and required for attaining the colour 750 m$\mu$ an acid influence of 16.8 minutes. Comparing with this glass the glass 4 according to the table above, in which 36.0 minutes are required, it will be found that adding titanium oxide in any form permits to so strongly reduce the stain sensitiveness, and this in quite a peculiar manner which may not be deduced from the chemical relationship with other quatrivalent oxides, that this stain sensitiveness nearly may be regarded as eliminated. Similar effects are obtained by partly or entirely substituting lead oxide or antimony oxide for the oxides of the elements of the second group of the periodic system, and this even when the content of earth-alkali oxides falls below 10%. Greater quantities of titanium oxide greatly increase the refraction and give the glass a brownish colour. For this reason the content of titanium oxide is conveniently not to surpass 20%, it being however advisable to make it not greater than 10%.

Highly refracting glasses not being permitted to have a content of silicic acid surpassing 55% and having to contain at least 25% of oxides of elements of the second group of the periodic system, lead and antimony, the new glasses may be characterized by stating that their content of silicic acid is inferior to 55%, that their content of oxides of elements of the second group of the periodic system, lead and antimony, is superior to 25% and that, moreover, they contain titanium oxide in quantities between 0.5 and 20%.

The following glasses represent further examples of the invention:

|  | 5 | 6 | 7 |
|---|---|---|---|
| $B_2O_3$ |  | 8.0 |  |
| $Na_2O$ | 2.5 |  | 0.5 |
| $K_2O$ | 4.4 |  | 1.0 |
| $CaO$ |  | 10.0 |  |
| $ZnO$ | 5.0 | 2.0 |  |
| $BaO$ | 8.0 | 35.2 |  |
| $PbO$ | 37.5 |  | 62.0 |
| $Sb_2O_3$ |  | 0.3 |  |
| $As_2O_3$ | 0.3 | 0.5 | 0.3 |
| $SiO_2$ | 38.3 | 32.0 | 31.2 |
| $TiO_2$ | 4.0 | 12.0 | 5.0 |
|  | 100.0 | 100.0 | 100.0 |

I claim:

1. An optical glass in which there exists between the refractive index $n_d$ and the relative dispersion $\gamma$ the relation $n_d > 1,77 - 0,0037\gamma$, containing 0.5% to 20% titanium oxide, the purpose of the titanium oxide being to reduce the susceptibility of the glass to tarnishing.

2. In an optical glass according to claim 1, the content of titanium oxide amounting from 0.5% to 10%.

3. An optical glass containing at most 55% silicic acid and containing further more than 25% oxides of elements of the second group of the periodic system, lead and antimony, and having a content of titanium oxide between 0.5% and 20%, the purpose of the titanium oxide being to reduce the susceptibility of the glass to tarnishing.

4. In an optical glass according to claim 3, the percentage of earth-alkali oxides in the content of oxides of elements of the second group of the periodic system being less than 10.

5. In an optical glass according to claim 3, the content of titanium oxide amounting from 0.5% to 10%.

EDWIN BERGER.